Figure 2:
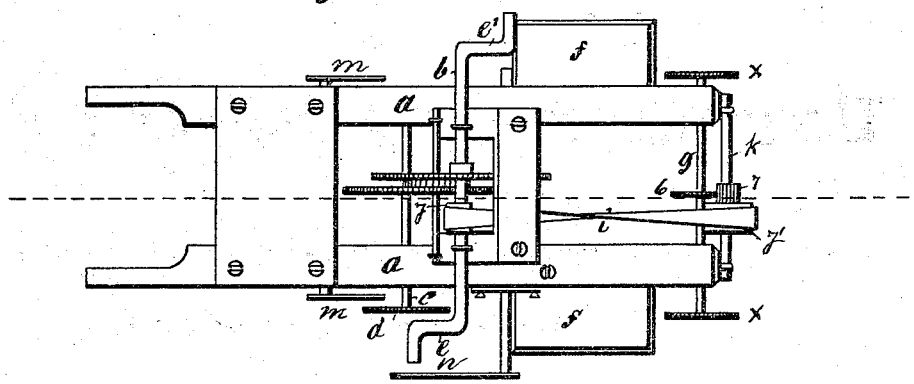

R. MOSELEY.
Ice-Cutters.

No. 153,978 — Patented Aug. 11, 1874.

Witness.
Katie A. Pitkin
Jeremy W. Blys

Inventor.
Robert Moseley

UNITED STATES PATENT OFFICE.

ROBERT MOSELEY, OF GLASTENBURY, CONNECTICUT.

IMPROVEMENT IN ICE-CUTTERS.

Specification forming part of Letters Patent No. 153,978, dated August 11, 1874; application filed April 23, 1874.

*To all whom it may concern:*

Be it known that I, ROBERT MOSELEY, of Glastenbury, county of Hartford and State of Connecticut, have invented certain new and useful Improvements in Ice-Cutting Machines; and to enable others skilled in the art to make the same I will proceed to describe, referring to the drawing, in which the same letters indicate like parts in each of the figures.

The nature of this invention consists in simplifying the mechanism of an ice-cutting machine so as to be cheap of manufacture, easy and effectual in its operation by one or two men while standing upon the machine.

Figure 3:
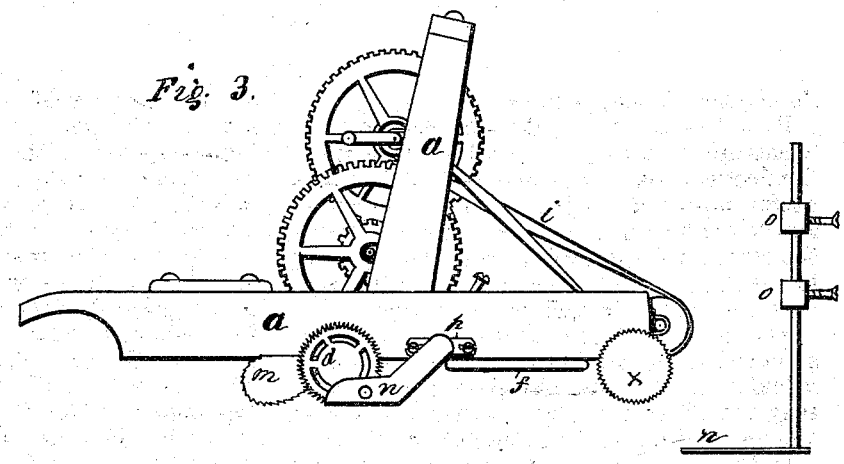
Figure 1:
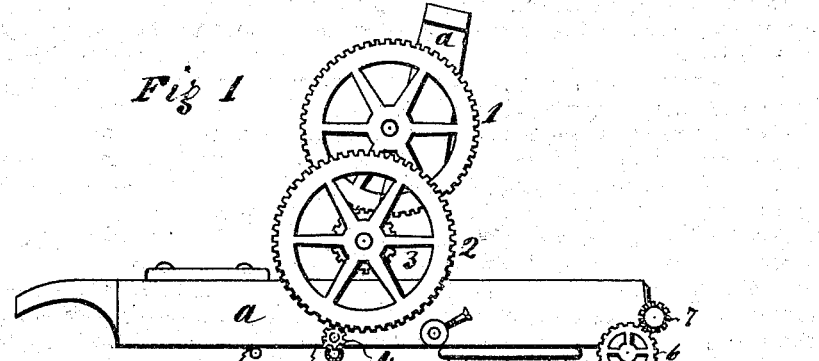

In the accompanying drawings, Figure 1 is a vertical section. Fig. 2 is a plan view. Fig. 3 is a side view.

$a$ is the frame-work of the machine, on which the mechanism is arranged and secured. 1 2 3 4 5 are a train of tooth-wheels for transmitting motion from the crank-shaft $b$ to the saw-shaft $c$. In a working machine the ends of all the shafting are fitted closely and turn freely in journal-boxes, secured firmly to the frame-work $a$. $d$ is the saw, secured to the outer end of the shaft $c$. $e$ $e'$ are the operating-cranks on the outer ends of the shaft $b$. $f$ is the platform upon which the operators stand to turn the cranks $e$ $e$. At one end of the frame is arranged a shaft, $g$, having toothed creeper-wheels $x$ secured on its outer ends, which serve to move the machine along conjointly with the cutting of the saw. The power for operating this scraper-shaft $g$ is derived through gears 6 and 7 and chain or belt $i$ over the pulley $j$ on the crank-shaft $b$ and pulley $j'$ on the shaft $k$. The gear 7 is fitted loosely upon the shaft $k$, so as to slide into or out of gear with gear 6, and is held in gear to operate by a clutch-pin in the side of pulley $j'$, so that it may be thrown into or out of gear when desirable. At the other end of the machine is a cam-shaft, having cams $m$ secured on the outer ends thereof for the purpose of elevating or depressing the frame-work to regulate the depth of the saw-cut. $n$ is a gage secured upon the outer end of an oscillating shaft to regulate the width of the blocks of ice to be cut, and is adjusted by collars $o$. One end of this shaft is secured in an adjustable box, $p$, for the purpose of regulating the gage $n$.

By the use of this machine the work of cutting ice is more rapidly performed, and the labor rendered pleasant instead of irksome, as in the old way.

I do not claim the arrangement of mechanism as shown in Patents 44,529, 70,994, 101,613.

What I claim, and desire to secure by Letters Patent, is—

The arrangement of gears 1 2 3 4 5, secured upon shafting fitted to work upon the elevated portion of the frame-work $a$, to operate the saw $d$ upon shaft $c$ by manual exertion through the crank-shaft $e$, substantially as and for the purpose set forth.

ROBERT MOSELEY. [L. S.]

Witnesses:
KATIE A. PITKIN,
JEREMY W. BLISS.